United States Patent [19]
Dockerty et al.

[11] 3,839,003
[45] Oct. 1, 1974

[54] METHOD OF PRESSING HOLLOW GLASS ARTICLES

[75] Inventors: Stuart M. Dockerty, Corning; William P. Lentz, Addison, both of N.Y.

[73] Assignee: Corning Glass Works, Corning, N.Y.

[22] Filed: Oct. 9, 1973

[21] Appl. No.: 404,498

[52] U.S. Cl. ........................... 65/71, 65/109, 65/302
[51] Int. Cl. .............................................. C03b 19/04
[58] Field of Search ........................ 65/71, 109, 302

[56] References Cited
UNITED STATES PATENTS

| | | | |
|---|---|---|---|
| 2,123,937 | 7/1938 | Engels | 65/71 |
| 3,151,968 | 10/1964 | Wallar | 65/71 X |
| 3,155,479 | 11/1964 | Zimmerman | 65/71 X |
| 3,471,280 | 10/1969 | Goddard et al. | 65/71 |

*Primary Examiner*—Arthur D. Kellogg
*Attorney, Agent, or Firm*—Burton R. Turner; Clarence R. Patty, Jr.

[57] ABSTRACT

Hollow funnel-like articles having relatively thick wall portions about an open mouth portion and relatively thin wall portions about a constricted yoke or neck portion are press-formed from molten glass by providing a pressing mold with a charge of molten glass in the form of a ring or band horizontally about wall portions thereof intermediate the upper and lower extent of said mold, and then pressing said glass charge by means of a plunger cooperating with a forming surface of said mold to force said charge both outwardly or upwardly and inwardly or downwardly within the mold cavity to form the desired article with substantially less pressing force than that required with conventional gobbing techniques.

12 Claims, 2 Drawing Figures

METHOD OF PRESSING HOLLOW GLASS ARTICLES

BACKGROUND OF THE INVENTION

The present invention pertains to the manufacture of glass bodies having a central opening. Although flat articles may be formed, the invention is primarily concerned with the manufacture of glass articles in the form of hollow truncated cone shapes or funnel-like shapes having a relatively thick main wall body portion and relatively thin walled neck and yoke portions extending from an aperture in the main wall portion. More particularly, the invention relates to the manufacture of glass envelopes comprising a main body portion of a funnel or hollow truncated cone shape with either circular or rounded-rectangular cross sections, a wide-mouth open end portion adjacent the large diameter end of the funnel-shaped body portion, and a tubular neck section projecting outwardly from the narrower yoke end of the funnel-shaped body portion. Such envelopes are utilized in the manufacture of cathode ray tubes, of the kind used for television reception, and the invention is especially concerned with the manufacture of such envelopes for cathode ray tubes.

Glass envelopes for cathode ray tubes are conventionally manufactured by either pressing or spinning operations or a combination of both. In the typical pressing operation, a charge of molten glass is deposited in the bottom of a female mold, and a male plunger is forced downwardly within the charge to force the molten glass charge to flow upwardly between the mold parts into a hollow funnel-like shape. Likewise, when centrifugally spinning the hollow funnel-like portions of cathode ray tubes, a charge of molten glass is deposited into the bottom of a rotatable mold, which is then centrifugally spun so as to distribute the charge upwardly along the walls of the mold to the upper extent thereof. Since the molten glass charge, in both the pressing and spinning operations, is initially delivered to the bottom most area of the forming mold, the surface of the molten charge in contact with the mold is chilled by the mold surface prior to the initiation of the pressing or spinning operation, and accordingly thick wall portions are formed adjacent the yoke or neck sections of the funnel, relative to the thickness of the remaining wall portions. Further, with the molten gob positioned in the bottom of a pressing mold, it is not only difficult to maintain plunger alignment in the yoke portion so as to avoid cracks or checks in such area upon completion of the pressing operation, but also the force applied by the plunge results only in an upward flow of the glass.

In the manufacture of funnels for envelopes of cathode ray tubes, it is usually desirable for the wall thickness of the yoke or neck portions of the funnel to be as small as practical, in order to enhance the effect on the electron beam of the magnetic deflection coils arranged outside the neck. However, as previously mentioned, the yoke or neck portions of funnels produced by conventionally known methods inherently have relatively thick wall portions due to excessive gob residence time in the bottom of the mold causing outer skin portions thereof to prematurely set up. Further, since the bottom-positioned gob of conventional pressing operations must be forced upwardly along the full height of the mold walls to a stop ring, not only are relatively high pressing forces required to complete the pressing operation, but also the high pressing force tends to produce an increase in lateral movement of the plunger, thus resulting in moil checking or cracking about the yoke portion upon an extraction of the plunger.

Thus, the present invention has overcome the problems heretofor encountered with conventional funnel-producing methods, by providing an annular or circular charge of molten glass about the mold, intermediate its upper and lower extent, and pressing such charge simultaneously upwardly and downwardly to its full extent so as to produce a funnel having relatively thick upper side wall portions and relatively thin yoke or neck portions. That is, since the molten charge is delivered intermediate the upper and lower extent of the mold, there is no deleterious gob residence time in the lower portion of the mold which would contribute to thick walls in the yoke or neck portions of the resulting funnel, and further, since pressing forces are materially reduced due to the simultaneous upward and downward flow of the charge, the moil checking problem previously encountered with known operations should be reduced.

SUMMARY OF THE INVENTION

The present invention relates to the pressing of hollow glass articles with improved thickness uniformity and a reduction in required pressing forces for a given sized article. The term "hollow glass articles" not only refers to tubular, funnel, or vessel shaped articles having linear or curvilinear wall elevations, but also to substantially planar articles having a central opening passing therethrough.

In its simplest form, the present invention includes the depositing or positioning of an annulus of molten glass on a forming surface intermediate its inner and outer extent, and the press-forming of the annular charge into a final article by simultaneously flowing the annular molten glass charge both outwardly and inwardly from the deposited annulus within a cavity formed between a pair of forming members, and in response to a pressing force exerted by such members. Preferably, the annulus of molten glass is deposited on the forming surface by rotating such surface under a stream of molten glass to form an annular charge. The charge should be so positioned upon the forming surface such that upon pressing, the flow of glass will arrive at both its desired inner and outer extents virtually simultaneously.

When forming a funnel-shaped object, the mold is rotated at a speed sufficient to hold the annular glass charge in its desired position on the mold wall against the pull of gravity. In fact, the position of the molten glass annulus may be adjusted by adjusting the speed of rotation of the mold, since a decrease in rotational speed will allow the annular charge to run downwardly, whereas an increase in the speed of rotation has a tendency to further distribute the annular charge upwardly and compensate for subsequent run-down which inherently occurs when the rotation of a mold is stopped for the pressing operation. However if desired, a synchronously rotated plunger may be utilized with the rotating mold to press-form the article, so as to avoid the necessity of stopping mold rotation. The press-forming of the annular charge provides for a more controlled or programmed wall thickness in the finished article, whereas conventional spinning techniques are dependent upon centrifugal forces.

By feeding the molten glass in an annular form to a forming surface intermediate the inward and outward or upward and downward extent of the desired article, a central open portion may be maintained for providing alignment means for the nose of the plunger, thus reducing plunger shift and the resulting moil checks which occur upon the withdrawal of an off-centered plunger. Further, since the annular charge flows simultaneously in both in upwardly and downwardly direction or inwardly and outwardly, as the case may be, the pressing force required to press the finished article is in the magnitude of about 2 to 5 times less than that required to press a similar article having a centrally positioned gob or charge of glass which is forced to flow only in an upwardly or outwardly direction. Thus, not only is the residence time of the molten glass in the critical moil area of a funnel for a TV envelope materially reduced, but also the pressure required to press such article is substantially reduced, as there are virtually no resistive forces on the leading edges of the annular charge as it is being pressed. Accordingly an improved glass distribution is obtained which provides for more desirable wall thicknesses including relatively thin walls in the moil area, and a central opening is maintained for utilizing plunger alignment means to reduce moil checking which is occassioned with conventional gobbing techniques.

It thus has been an object of the present invention to provide a new method of pressing glass articles having a central aperture wherein more desirable distribution is obtained with less pressing force than that previously required with conventional techniques.

A further object of the present invention has been to provide a novel method of feeding a charge of molten glass to the forming surface of a mold so as to facilitate the press-forming of such charge into a finished article with less pressing force than that previously required with conventional gobbing techniques.

DESCRIPTION OF THE PREFERRED EMBODIMENTS

Figure 1:
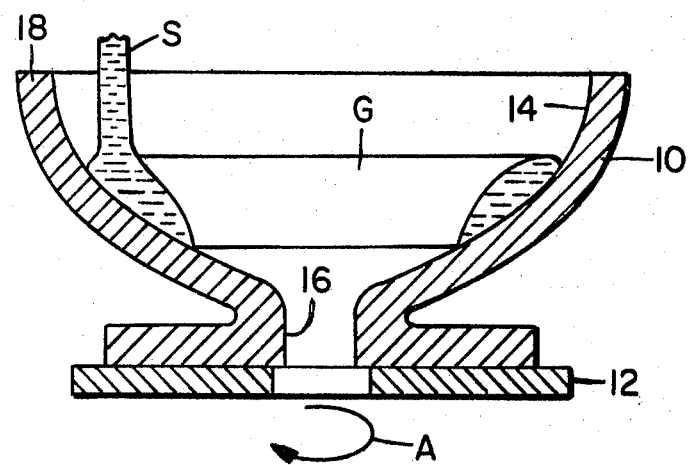
FIG. 1 is a somewhat schematic sectional view in elevation illustrating the positioning of an annular charge of molten glass on the forming surface of a mold.

Referring now to the drawings, and particularly FIG. 1, a rotatable mold 10 for forming the funnel of an envelope for a cathode ray tube is shown mounted upon a suitable support 12. The mold has an inner forming surface 14 which extends upwardly and outwardly from a central opening or aperture 16. A stream of molten glass S is shown being delivered to the inner forming surface 14 intermediate its lower inner extent defined by aperture 16 and its upper outer extent defined by rim edge 18. By rotating the mold 10 about a central axis parallel to the flow within such stream as indicated by arrow A, the stream forms an annular or doughnut-like charge of molten glass G about the inner forming surface 14 intermediate its upper and lower extent.

Figure 2:
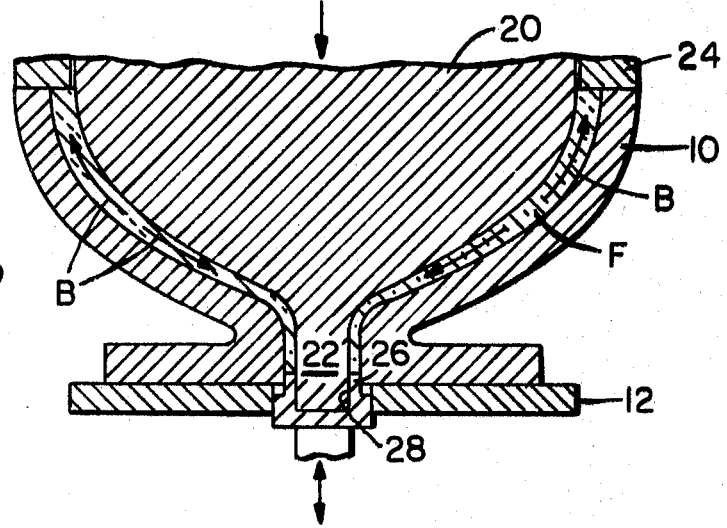
FIG. 2 is a sectional view in elevation similar to FIG. 1 illustrating the press-forming of the annular molten glass charge between a mold and plunger.

Referring now to FIG. 2, it will be seen that after the charge is deposited onto forming surface 14, the rotation of mold 10 is stopped and a plunger 20 having a nose portion 22 is moved downwardly into mold 10 to press-form the annular charge G into a funnel-shaped article F therebetween. As shown by the arrows B, the annular charge G simultaneously flows both upwardly and downwardly or inwardly and outwardly between the forming surface 14 and plunger 20 to suitable end stops such as mold ring 24 and knock out member 26. In view of the fact that the nose portion of 22 of the plunger 20 arrives at the central aperture 16 before the flow of molten glass from annular charge G, it is possible to provide the knock out member 26 with a recessed bearing or guide portion 28 for receiving and aligning nose portion 22 of plunger 20. However, since the annular charge G positioned intermediate the upper and lower or inner and outer extent of forming surface 14, not only flows in opposite directions while being pressed but also leaves the bottom center portion of the mold free of glass thus permitting nose portion 22 to freely enter central aperture 16, the required pressing force is substantially less from that encountered with conventional gobbing techniques and the tendency to laterally shift the plunger during pressing is not as great. Although the utilization of recessed bearing or guide portion 28 may be useful to effect centering when utilizing a floating plunger, it is not deemed to be necessary when using a rigidly mounted precision operable plunger. Upon completion of the pressing operation, which may be either free pressing or pressing to a ring, the knock out member 26 is moved upwardly to effect the removal of the pressed article F from the mold 10.

When forming a hollow shaped article as shown in the drawings, the positionment of the doughnut or annular charge G upon the forming surface 14 is not only determined by the point of impingement of stream S upon the mold, but also by the rotation of the mold 10 about a vertical axis as shown by arrow A, which distributes the stream into the doughnut or annular shaped charge G. Since gravitational forces act upon the molten charge G as the stream S supplies a sufficient quantity of glass during the rotation of the mold, the mold is preferably kept at a speed of at least 60 rpm to maintain the annular doughnut-like charge G in position on the forming surface 14 intermediate its upper and lower extent. However, we have found that by rotating the mold 10 above 60 rpm it is possible to distribute the charge upwardly along the forming surface 14 so that when the rotation of the mold is stopped to receive the plunger 20, gravitational forces will have acted upon the charge to bring it back to its desired position intermediate the upper and lower extent of forming surface 14 for proper pressing. That is, since the charge is normally maintained in position with a mold rotation of about 60 rpm, it has a tendency to run down slightly after the mold rotation has stopped and prior to the time that the plunger 10 may be operatively inserted therewithin. The actual position of the annular charge on the forming surface 14 is predicated upon the shape of the article being formed and the desired wall thickness distribution for the final article. That is, keeping into account the volume of glass which must flow both inwardly and outwardly from the charge to complete the article, the charge should be so positioned such that upon pressing, the molten glass arrives at both the inner and outer extent of the article at substantially the same time. Accordingly, although the doughnut-shaped charge should be positioned upon the forming surface intermediate its inner and outer extent, it need not be positioned exactly midway therebetween since its positionment will be determined by the glass flow required to fullfill the desired shape and wall distribution of the final article.

When pressing flat articles having a central opening or aperture, the same pressing and the glass flow principles apply as described with regard to the funnel or bowl shaped articles. However, the flat mold surface must be rotated at a relatively slow speed in order to avoid undesirable centrifugal action on the annular or doughnut shaped charge. Like the funnel-shaped article, the annular charge should be positioned on the flat mold surface so that upon pressing, the flow of molten glass will reach the desired inner and outer extent at substantially the same time. By so positioning the annular charge, the molten glass is forced to flow simultaneously inwardly and outwardly therefrom, thus materially reducing the pressing force over that required when a centrally positioned gob is merely pressed outwardly to form the same article.

When forming the annular charge by depositing a stream of molten glass on a rotating forming surface, it has been found advantageous to rotate the surface several times while building-up the desired quantity of molten glass in the doughnut-like charge. That is, although it would be possible to form a doughnut-like charge by merely rotating the mold with only one complete rotation, non-uniformity in the deposited charge due to overlap and shear tail is materially reduced by rotating the mold through about 2 to 8 complete rotations while building-up the desired charge weight. Accordingly, a smooth uniform doughnut or annular charge is provided on the forming surface and the resulting shear tail being proportionately smaller than the annular charge is of virtually no consequence. Further, when forming a funnel or bowl-like article, the annular glass charge can be further distributed upwardly or downwardly along the forming surface merely by increasing or decreasing the rate of rotation, respectively, prior to commencing the pressing operation. Accordingly, predistribution of the glass can be obtained so as to enhance glass flow upon pressing, to form wall portions with desired thickness uniformity.

Although it will be appreciated that the operating parameters will vary in accordance with the size and shape of the article being formed and the particular glass utilized, the following sets forth a specific example of the steps undertaken to form a 25 inch funnel for a cathode ray tube. A stream of TV funnel glass at a temperature of about 1140°C. and at a viscosity of about 800 poises was delivered intermediate the upper and lower extent of the forming surface of a rotating metal mold for forming a 25 inch funnel. The mold was rotated at about 72 rpm during the loading for approximately 4 turns to receive 18 pounds of glass. The rotation speed of 72 rpm had a tendency to distribute the annular charge of molten glass slightly upwardly along the forming surface of the mold to compensate for the subsequent rundown which is experienced when the mold rotation is stopped in preparation for receiving the plunger. In view of the fact that the delivery stream was relatively small with respect to the accumulated annular charge, the shear tail folded into the charge with negligible consequences. After stopping the mold rotation, the annular charge was pressed with a complementary plunger under a pressure of about 900 psi. The plunger was allowed to dwell for about 8 seconds and upon removal thereof the newly formed funnel was cooled with air. The resulting funnel exhibited good glass distribution with relatively thin neck and yoke portions while providing a good sealing edge around the large open mouth portion of about .5 inches. Although a plunger nose guide portion was not utilized during this particular example, the annular charge of molten glass was pressed to a mold ring at its upper outer extent and to a knockout block at its lower inner extent.

Although we have disclosed the now preferred embodiments of our invention it will be apparent to those skilled in the art that various changes and modifications may be made thereto without departing from the spirit and scope thereof as defined in the appended claims.

We claim:

1. A method of forming articles having a central aperture from molten glass which comprises, depositing an annular charge of molten glass onto a forming surface intermediate its inner and outer extent, applying pressure to said annular charge and simultaneously flowing such charge inwardly and outwardly of its initially deposited position, and forming an article having a central aperture extending therethrough.

2. A method of forming glass articles as defined in claim 1 including the step of delivering a stream of molten glass to the forming surface and rotating the surface about a central axis to form an annular charge of molten glass thereon intermediate its inner and outer extent.

3. A method of forming glass articles as defined in claim 1 including the steps of pressing the annular charge of molten glass within a confined space between the forming surface and a cooperating plunger, and simultaneously flowing the molten glass of such charge both inwardly and outwardly thereof so that it reaches the inner and outer extent of the forming surface at substantially the same time.

4. A method of forming glass articles as defined in claim 1 including the steps of delivering a stream of molten glass on a concave forming surface intermediate its upper and lower extent, and rotating said forming surface about a central axis extending substantially parallel to the flow in said delivery stream at a speed sufficient to maintain an annular charge of molten glass on said surface.

5. A method of forming glass articles as defined in claim 4 including the steps of rotating the forming surface at a speed sufficient to impart centrifugal action to the annular charge, and distributing such charge upwardly along the concave surface to compensate for subsequent rundown prior to applying the pressure to said annular charge.

6. In the pressing of articles from molten glass, a method of charging a mold with molten glass so as to substantially reduce the pressing force over that required to form the article with central gob charging which comprises, distributing an annular charge of molten glass onto a concave forming surface intermediate its upper and lower extent, pressing such charge against said forming surface, and simultaneously flowing such charge both upwardly and downwardly along said concave forming surface to form a glass article with reduced pressing forces having improved wall thickness distribution.

7. A method of charging a mold with molten glass as defined in claim 6 including the steps of delivering a stream of molten glass to the concave forming surface intermediate its upper and lower extent, and rotating said forming surface about a central axis substantially parallel to the delivery stream to form an annular charge of molten glass about said forming surface.

8. A method of charging a mold with molten glass as defined in claim 7 including the steps of regulating the speed of rotation of the concave surface so as to apply centrifugal force to the annular charge, and flowing at least a portion of such charge upwardly along said concave surface prior to pressing the charge against said forming surface.

9. A method of forming a funnel-shaped article having a lower central aperture surrounded by relatively thin wall portions and an upper edge portion having relatively thick wall portions which comprises, delivering a stream of molten glass to the forming surface of a funnel-shaped mold intermediate its upper and lower extent, rotating said mold about a central vertical axis to form an annular charge of molten glass on said forming surface intermediate its upper and lower extent, regulating the speed of rotation of said mold so to at least maintain said annular charge in its original position on said forming surface, pressing said annular charge between said forming surface and a complementary surface of a plunger, and simultaneously flowing the molten glass from said charge both upwardly and downwardly so as to arrive substantially simultaneously at the upper and lower extent of said forming surface.

10. A method of forming funnel-shaped articles from molten glass as defined in claim 9 including the steps of increasing the rotational speed of said mold to apply centrifugal force to said annular charge, flowing at least a portion of said charge upwardly along said forming surface, stopping the rotation of said mold, and press-forming a funnel-shaped article to upper and lower stops.

11. A method of forming funnel-shaped articles from molten glass as defined in claim 9 including the step of lowering a portion of said plunger through an aperture in the bottom of said mold, and guidably receiving said portion of the plunger in a confined recess to prevent lateral shifting of the plunger during the pressing of the annular charge.

12. A method of forming funnel-shaped articles from molten glass as defined in claim 9 including the steps of forming a funnel-shaped mold with a central aperture extending through the bottom thereof, providing an extended nose portion on said plunger in axial alignment with said aperture, moving said plunger downwardly into engagement with said annular charge to press-form said article, and projecting said nose portion through said aperture prior to the flow of molten glass from said charge reaching said aperture so as to thereby integrally press-form a neck portion on said funnel.

* * * * *